United States Patent
Tengeiji et al.

(10) Patent No.: US 6,930,724 B1
(45) Date of Patent: Aug. 16, 2005

(54) SOLID-STATE IMAGE SENSING APPARATUS WITH A RELATIVE POSITIONAL LIGHT SHIFT

(75) Inventors: Hideki Tengeiji, Yokohama (JP); Toshiya Endo, Yokohama (JP); Yoshichi Otake, Kamakura (JP)

(73) Assignee: Victor Company of Japan, Ltd., (JP)

( * ) Notice: Subject to any disclaimer, the term of this patent is extended or adjusted under 35 U.S.C. 154(b) by 940 days.

(21) Appl. No.: 09/660,052

(22) Filed: Sep. 12, 2000

(30) Foreign Application Priority Data

Sep. 17, 1999 (JP) ................................. 11-264018

(51) Int. Cl.[7] .......................... H04N 3/14; H04N 5/335; H04N 5/238
(52) U.S. Cl. ...................................... 348/367; 348/317
(58) Field of Search ................................ 348/317, 367

(56) References Cited

U.S. PATENT DOCUMENTS

| | | | | |
|---|---|---|---|---|
| 6,018,363 A * | 1/2000 | Horii | ........................ | 348/219.1 |
| 6,108,036 A * | 8/2000 | Harada et al. | ........... | 348/219.1 |
| 6,195,125 B1 * | 2/2001 | Udagawa et al. | ........ | 348/222.1 |
| 6,577,341 B1 * | 6/2003 | Yamada et al. | ............. | 348/282 |
| 6,650,361 B1 * | 11/2003 | Shiomi | ..................... | 348/218.1 |
| 6,678,000 B1 * | 1/2004 | Sakata | ......................... | 348/369 |
| 6,686,956 B1 * | 2/2004 | Prakash et al. | .......... | 348/218.1 |
| 2002/0126209 A1 * | 9/2002 | Yamada et al. | ............. | 348/219 |

FOREIGN PATENT DOCUMENTS

JP    1996-275067    3/1995    .......... H04N 5/335

* cited by examiner

Primary Examiner—Wendy R. Garber
Assistant Examiner—James M. Hannett
(74) Attorney, Agent, or Firm—Renner, Kenner, Greive, Bobak, Taylor & Weber (57) ABSTRACT

Light from an object is incident to an image sensing device and converted into an image signal. The image sensing device is exposed to the light by a shutter, provided between the object and the solid-state image sensing device, for a first exposure period and a second exposure period that directly follows the first exposure period. The first and the second periods are the same length in time. Each exposure period for exposing the solid-state image sensing device to the light corresponds to one frame or one filed of the object. A passage of the light that has passed the shutter and incident to the solid-state image sensing device is shifted in a predetermined direction with respect to the solid-state image sensing device at least in the second exposure period. Image signals converted for the first and the second exposure periods are combined to generate a composite image signal.

2 Claims, 7 Drawing Sheets

SOLID-STATE IMAGE SENSING APPARATUS WITH A RELATIVE POSITIONAL LIGHT SHIFT

BACKGROUND OF THE INVENTION

The present invention relates to image sensing using a solid-state image sensing apparatus. Particularly, this invention relates to image sensing using a solid-state image sensing apparatus with a function of shifting light from an object to shift pixels for enhancing resolution equivalent to the resolution of a solid-state image sensing apparatus having a larger number of pixels.

Video cameras with a digital still-photographing function and digital still cameras install a solid-state image sensing apparatus with a function of shifting light incident to a solid-state image sensing device from an object to shift pixels for enhancing resolution equivalent to the resolution of a solid-state image sensing apparatus having a larger number of pixels (called a pixel-shifting function hereinafter).

Figure 1:
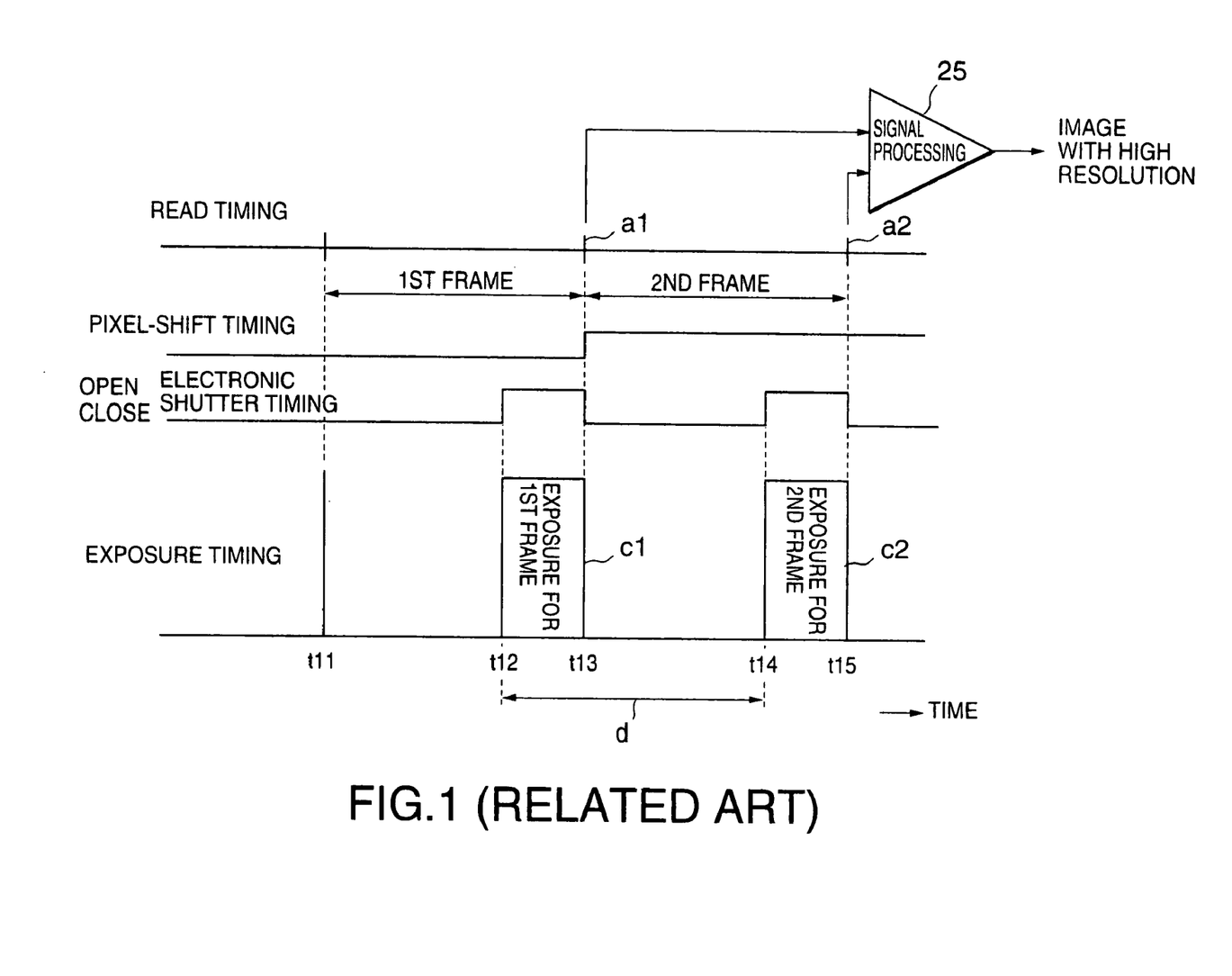
FIG. 1 is a timing chart for explaining an operation of a conventional solid-state image sensing apparatus.

Illustrated in FIG. 1 is a timing chart of exposure and reading for a solid-state image sensing device with such a pixel-shifting function. As illustrated in EXPOSURE TIMING, exposure of a charge-coupled device (CCD) as a solid-state image sensing device for the first frame starts at time t11, charges that have been stored on the CCD are discharged at time t12 by an electronic shutter that is ON (opened) at timing as illustrated in ELECTRONIC SHUTTER TIMING, and exposure starts again.

For progressive-scanning, charges stored on pixels are once transferred to a vertical transfer register at time t13. Then, at timing a1 as illustrated in READ TIMING, the charges are transferred to a horizontal transfer register and read out. The period from time t12 to time t13 is an exposure period c1. Charges stored on the CCD for this period are output as an image signal for the first frame.

Exposure of the CCD for the second frame starts at right after time t13, charges that have been stored on the CCD are discharged at time t14 by the electronic shutter that is ON (opened) at timing as illustrated in ELECTRONIC SHUTTER TIMING, and exposure starts again. Charges stored on pixels are once transferred to the vertical transfer register at time 1t5. Then, at timing a2 as illustrated in READ TIMING, the charges are transferred to the horizontal transfer register and read out. The period from the time t14 to time t15 is an exposure period c2. Charges stored on the CCD for this period are output as an image signal for the second frame.

Before exposure for the second frame, light incident to the CCD from an object is shifted by one line in the vertical direction as illustrated in PIXEL-SHIFT TIMING.

The image signals read out at timing a1 and a2 illustrated in READ TIMING for the first and the second frames are combined by signal processing 25 and output for enhancing resolution equivalent to the resolution of a solid-state image sensing apparatus having a larger number of pixels.

Figure 2:
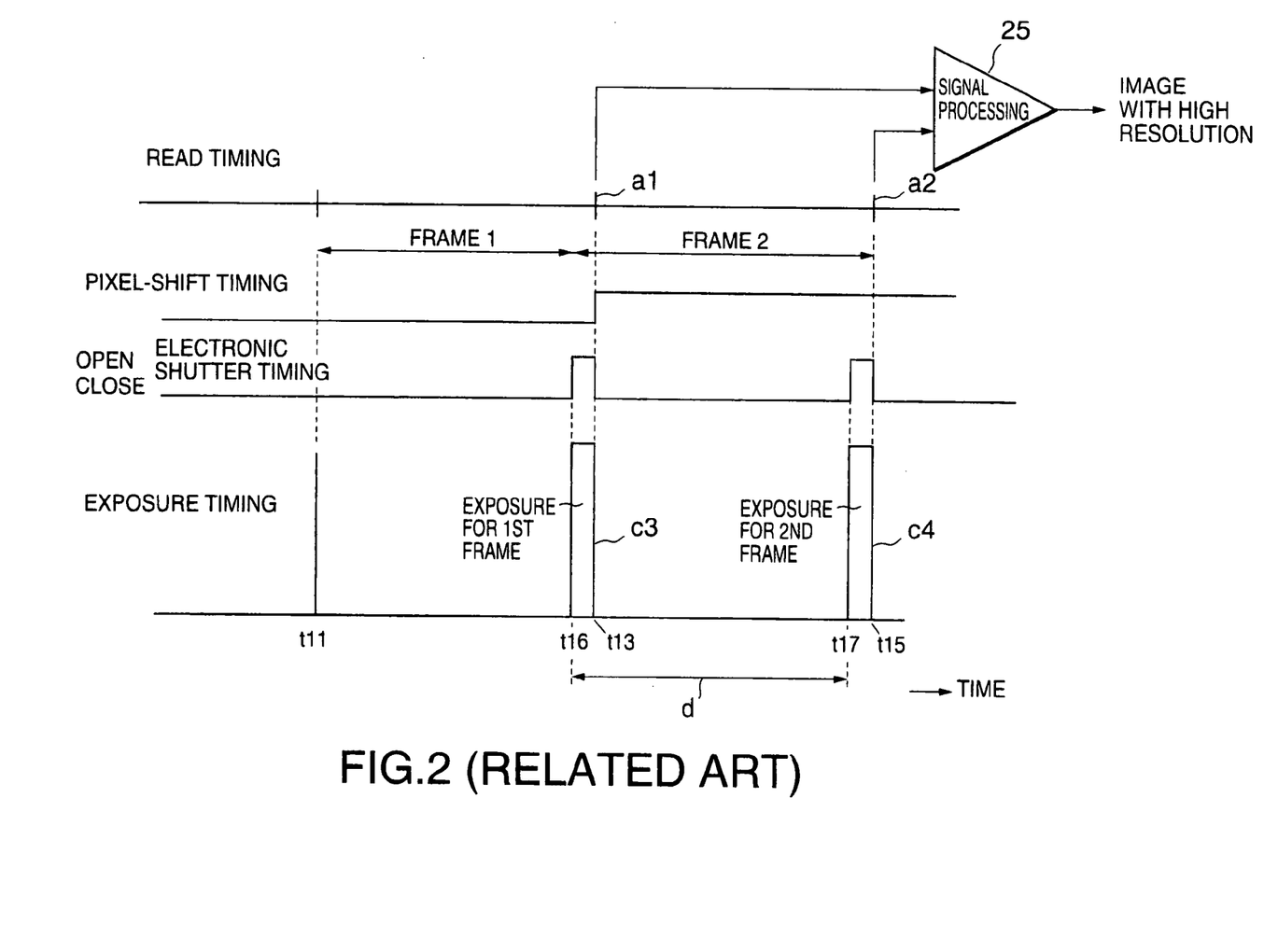
FIG. 2 is a timing chart for explaining another operation of a conventional solid-state image sensing apparatus.

Illustrated in FIG. 2 is another timing chart of exposure and reading for a solid-state image sensing device with a pixel-shifting function.

The higher the shutter speed, the shorter the exposure period for each frame as illustrated as c3 and c4 compared to the periods c1 and c2 shown in FIG. 1. This causes delay in charge storing starting time to the CCD as time t16 and time t17, compared to time t12 and time t14 shown in FIG. 1. Charges are, however, read at time t13 and time t15 at which frames terminate, the same as shown in FIG. 1.

Solid-state image sensing apparatus as described above perform charge-reading when each frame terminates, thus resulting in displacement of image in time as illustrated in "d" in FIGS. 1 and 2, even in photographing with high-speed shutter for avoiding blurry photos.

A shutter speed for CCDs as illustrated in FIG. 2 higher than that illustrated in FIG. 1 will not cancel the displacement of image "d" as discussed above due to a fixed shutter speed for CCDs.

Solid-state imaging apparatus with a pixel-shifting function having a large displacement of image "d" as discussed above produce blurry photos with a deteriorated image quality.

SUMMARY OF THE INVENTION

A purpose of the present invention is to provide an apparatus and a method of image sensing using a solid-state imaging device with a pixel-shifting function that achieve a high shutter speed with less blurry photos.

The present invention provides an image sensing apparatus including: a solid-state image sensing device to convert light from an object into an image signal; a shutter, provided between the object and the solid-state image sensing device, to expose the solid-state image sensing device to the light for a first exposure period and a second exposure period that directly follows the first exposure period, the first and the second periods being the same length in time, each exposure period for exposing the solid-state image sensing device to the light corresponding to one frame or one filed of the object; a shift mechanism, to shift a passage of the light that has passed the shutter and incident to the solid-state image sensing device in a predetermined direction with respect to the solid-state image sensing device at least in the second exposure period; and a processor to combine image signals converted for the first and the second exposure periods to generate a composite image signal.

Moreover, the present invention provides a method of image sensing using a solid-state image sensing device for converting light from an object into an image signal. The solid-state image sensing device is exposed to the light for a first exposure period and a second exposure period that directly follows the first exposure period. The first and the second periods are the same length in time. Each exposure period for exposing the solid-state image sensing device to the light corresponds to one frame or one filed of the object. A passage of the light incident to the solid-state image sensing device is shifted in a predetermined direction with respect to the solid-state image sensing device at least in the second exposure period. Image signals converted for the first and the second exposure periods are combined to generate a composite image signal.

DETAILED DESCRIPTION OF PREFERRED EMBODIMENTS

Preferred embodiments according to the present invention will be disclosed with reference to the attached drawings.

Figure 3:
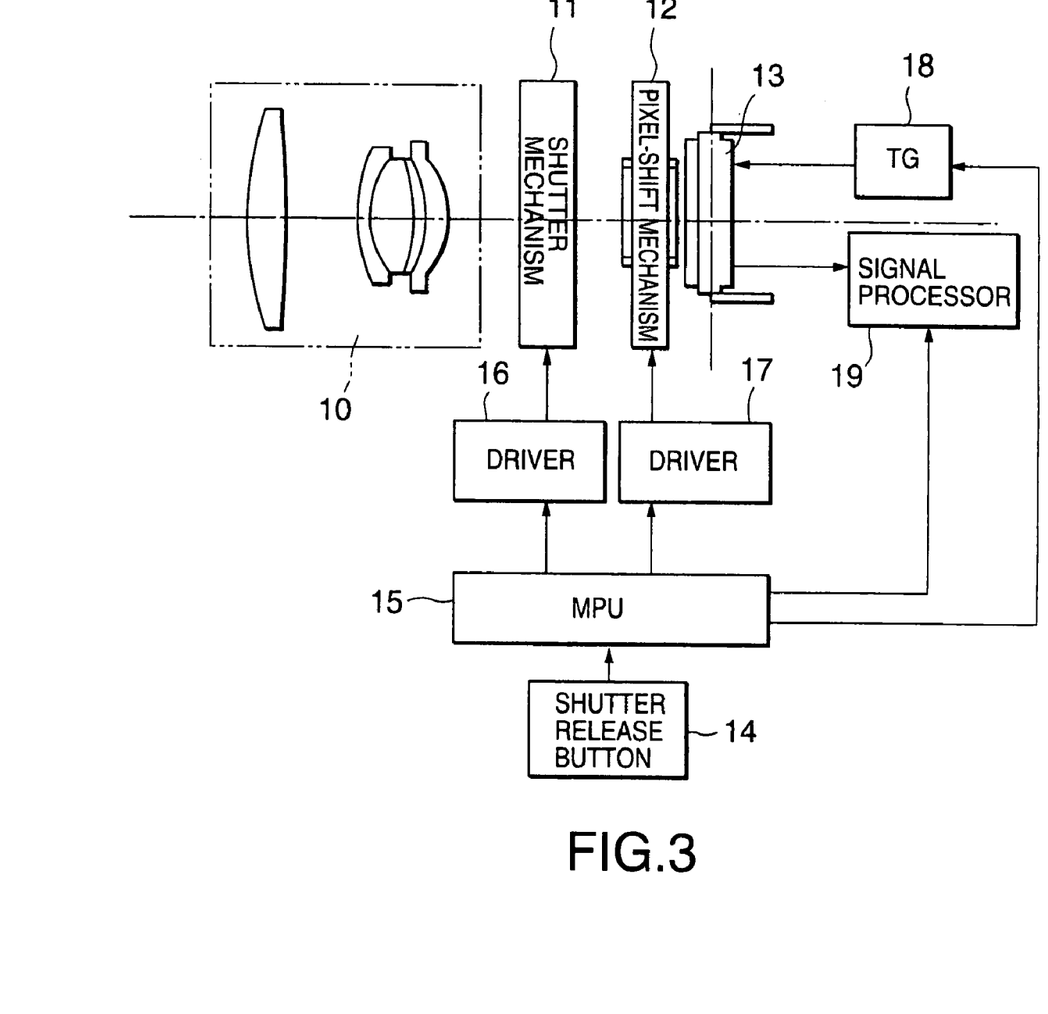
FIG. 3 shows a block diagram of a preferred embodiment of a solid-state image sensing apparatus according to the present invention.

FIG. 3 shows a block diagram of a preferred embodiment of a solid-state image sensing apparatus according to the present invention.

Light from an object (not shown) is incident to a shutter mechanism 11 through a lens mechanism 10. The shutter mechanism 11 (one of the important elements of this invention) is a mechanical shutter operated by a user via a shutter release button 14.

The light that has passed through the shutter mechanism 11 is further incident to an imaging circuit 13 through a pixel-shift mechanism 12. The imaging circuit 13 is provided with a CCD, a vertical transfer resister and a horizontal transfer resister.

The light incident to the imaging circuit 13 is converted into an image signal by photo-to-electric conversion under the control by a timing signal fed by a timing signal generator (TG) 18. The image signal is supplied to a signal processor 19.

The shutter mechanism 11 and the pixel-shift mechanism 12 are controlled by a microprocessor (MPU) 15 via drivers 16 and 17, respectively, in response to the operation of the shutter release button 14.

Figure 4:
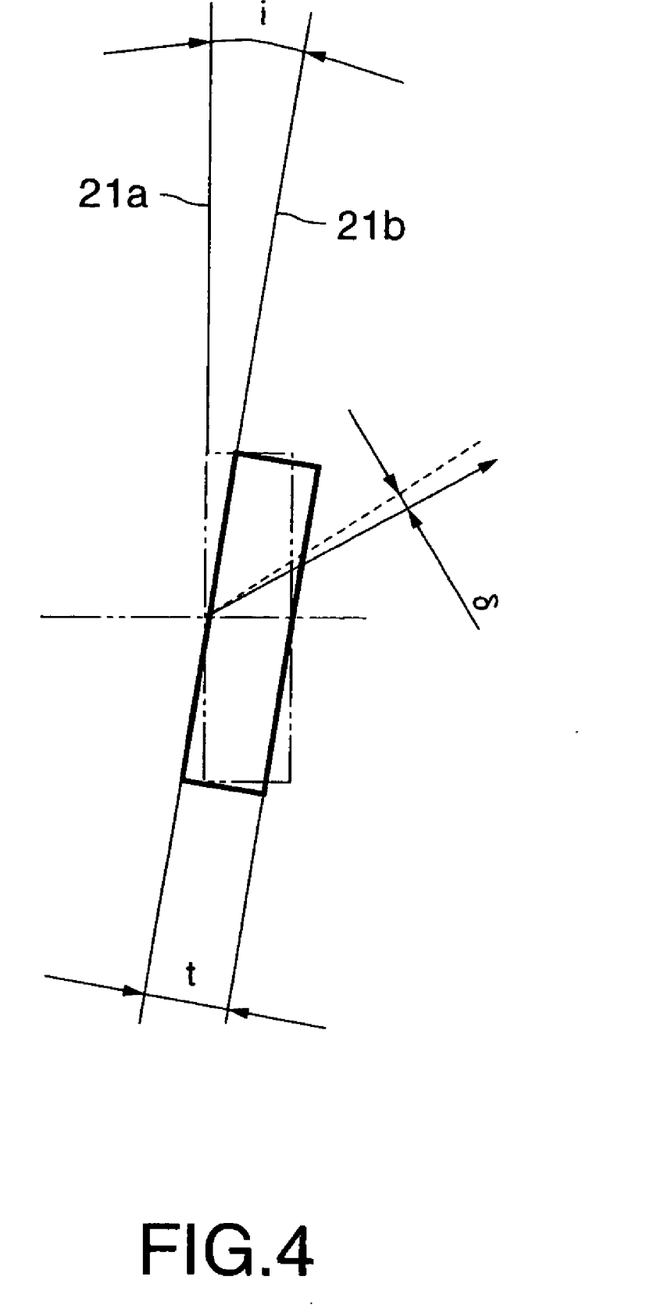
FIG. 4 illustrates a principle of pixel-shifting according to the present invention.

As illustrated in FIG. 4, the pixel-shifting mechanism 12 is provided with an optical low-pass filter having a glass plate that is shifted between two positions 21a and 21b.

This shifting causes displacement of light passing through the optical low-pass filter by an angle $\delta(=\{(1-n)/n\}\cdot\sin(i)\cdot t)$ where "i" is a rotary angle from the position 21a to 21b, and vice versa, and "n" is a refraction index. The rotary angle "i"-setting offers displacement of a passage of the incident light by one line to the CCD.

The operation as the first preferred embodiment of the solid-state imaging apparatus according to the present invention will be described with reference to FIGS. 3 and 5.

When a user presses the shutter release button 14 for photographing a still object, light from the object is incident to the imaging circuit 13 through the lens mechanism 10, shutter mechanism 11 and pixel-shifting mechanism 12.

Figure 5:
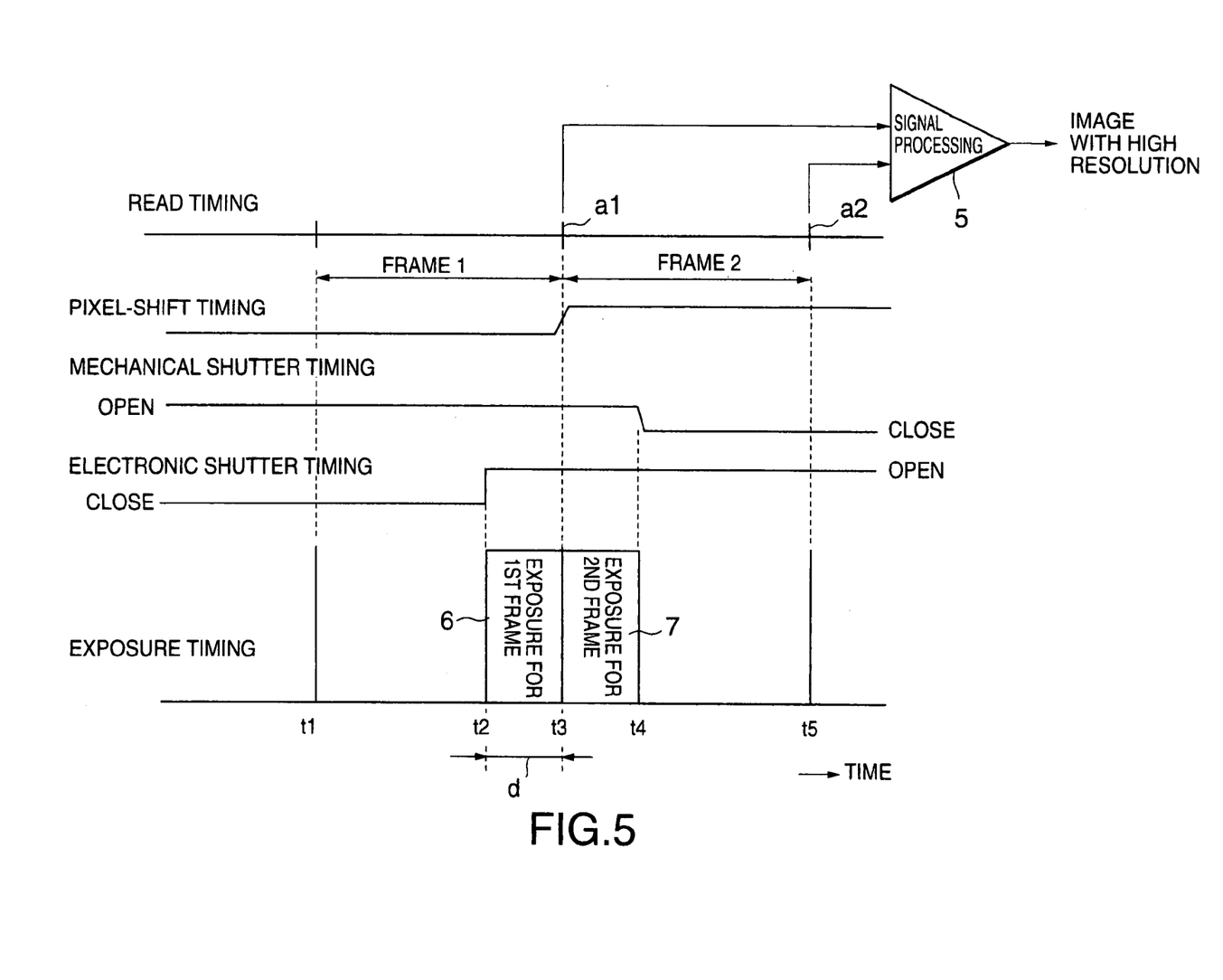
FIG. 5 is a timing chart for explaining the first preferred embodiment of an operation of a solid-state image sensing apparatus according to the present invention.

As illustrated in EXPOSURE TIMING of FIG. 5, charges are stored on the CCD from just after time t1 that is a starting moment of the first frame, discharged at time t2 by an electronic shutter of the CCD, that is ON (opened) as illustrated in ELECTRONIC SHUTTER TIMING, and stored again.

At time t3 that is a terminating moment of the first frame, all the charges stored on the CCD are transferred to the vertical transfer register of the imaging circuit 13. The charges are further transferred to the horizontal transfer register of the imaging circuit 13 and read out.

As disclosed, an image signal for the charges stored from time t2 to time t3 is read out at a read timing a1 as illustrated in READ TIMING; and hence the period from time t2 to time t3 is an exposure period 6.

After time t3, the MPU 15 controls the pixel-shift mechanism 12 via the driver 17 so that the light incident to the CCD is shifted by one line in the vertical direction, as illustrated in PIXEL-SHIFT TIMING of FIG. 5.

The MPU 15 also controls the shutter mechanism 11 via the driver 16 to shut out the light from being incident to the CCD at time 4 after time passes the same period as the exposure period 6, or the exposure period 7. The light is prevented from being incident to the CCD at and after time t4.

Charges for the second frame are stored on the CCD of the imaging circuit 13 for the period from time t3 to time t4. The charges are kept at time t4 because no light is incident to the CCD after time t4, so that no charges are stored on the CCD, thus causing no overflow, resulting in no discharging operation.

All the charges that have been stored on the CCD are transferred to the vertical transfer register at time t5 at which the second frame terminates under the control by a timing signal fed by the TG 18. The charges are further transferred to the horizontal transfer register and read out.

As disclosed, an image signal for the charges stored from time t3 to time t4 is read out from the imaging circuit 13 at time t5, or a read timing a2 as illustrated in READ TIMING; and hence the period from time t3 to time t4 is an exposure period 7 as illustrated in EXPOSURE TIMING, by the mechanical shutter whose timing is illustrated as MECHANICAL SHUTTER TIMING.

The image signals for the fist and the second frames are supplied to the signal processor 19 and combined as an output composite imaging signal, as illustrated in SIGNAL PROCESSING 5.

In this embodiment, the displacement "d" of the image signals in time for the fist and the second frames corresponds to the exposure time 6 from time t2 to time t3, which is shorter than those shown in FIGS. 1 and 2, thus avoiding blurry photos.

Next, the operation as the second preferred embodiment of the solid-state imaging apparatus according to the present invention will be described with reference to FIG. 6. A shutter speed is higher in the second embodiment than that in the first embodiment.

Figure 6:
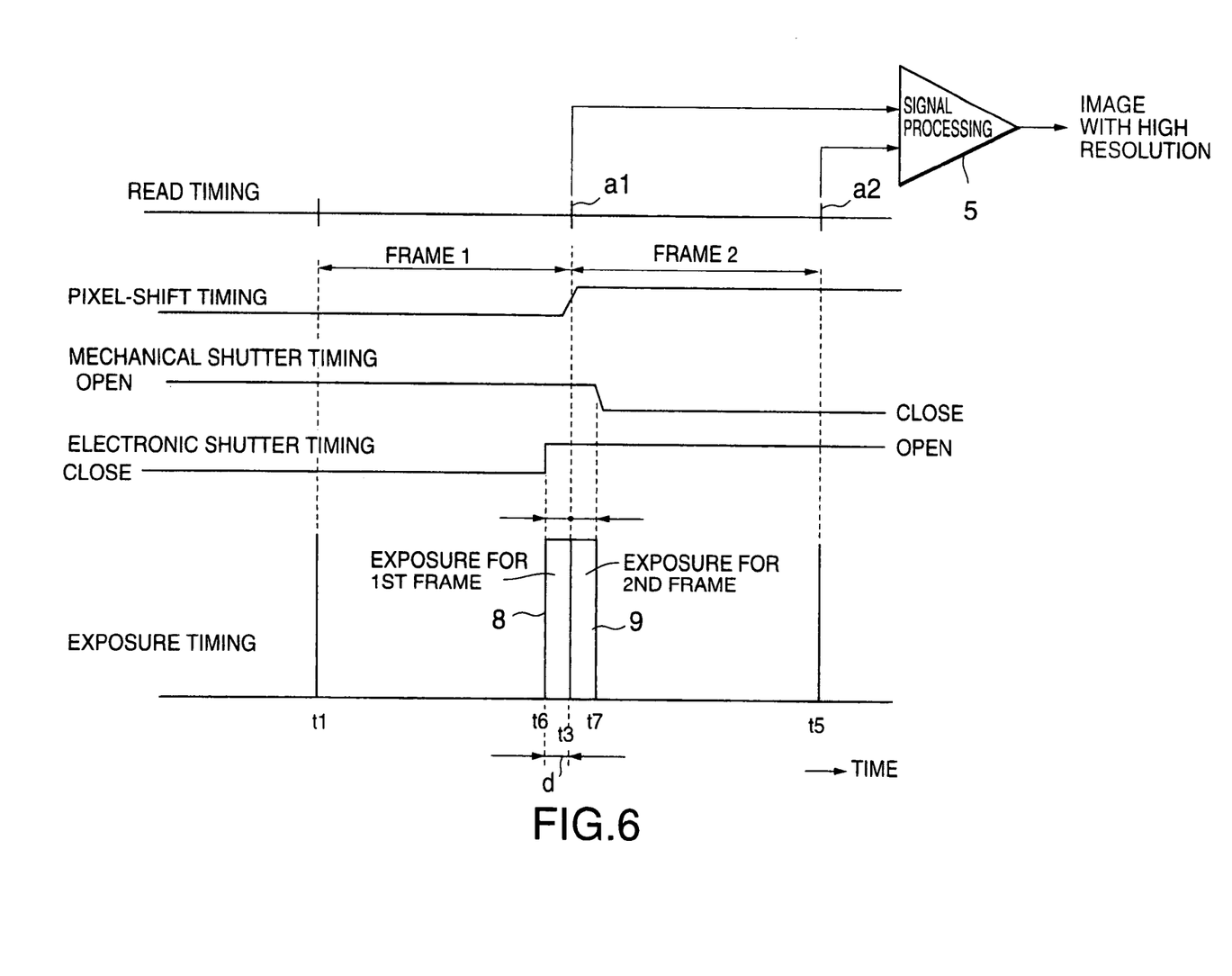
FIG. 6 is a timing chart for explaining the second preferred embodiment of an operation of a solid-state image sensing apparatus according to the present invention.

At time t1 illustrated in EXPOSURE TIMING of FIG. 6, that is a starting moment of the first frame right after a user presses the shutter release button 14, charges are stored on the CCD of the imaging circuit 13, discharged at time t6 by the electronic shutter of the CCD, that is ON (opened) as illustrated in ELECTRONIC SHUTTER TIMING, and stored again. The time t6 in FIG. 6 is later than time t2 in FIG. 5 with respect to time t1. The electronic shutter has been ON (opened) after time t6.

At time t3 that is a terminating moment of the first frame, all the charges stored on the CCD are transferred to the vertical transfer register of the imaging circuit 13. The charges are further transferred to the horizontal transfer register of the imaging circuit 13 and read out.

As disclosed, an image signal for the charges stored from time t6 to time t3 is read out at a read timing a1 as illustrated in READ TIMING; and hence the period from time t6 to time t3 is an exposure period 8. The higher the shutter speed, the shorter the exposure period 8.

After time t3, the MPU 15 controls the pixel-shift mechanism 12 via the driver 17 so that the light incident to the CCD is shifted by one line in the vertical direction, as illustrated in PIXEL-SHIFT TIMING of FIG. 6.

The MPU 15 also controls the shutter mechanism 11 via the driver 16 to shut out the light from being incident to the CCD at time t7 after time passes the same period as the exposure period 8, or the exposure period 9. The light is prevented from being incident to the CCD at and after time t7.

Charges for the second frame are stored on the CCD of the imaging circuit 13 for the period from time t3 to time t7. The charges are kept at time t7 because no light is incident to the CCD after time t7, so that no charges are stored on the CCD, thus causing no overflow, resulting in no discharging operation.

All the charges that have been stored on the CCD are transferred to the vertical transfer register at time t7 at which the second frame terminates under the control by a timing signal fed by the TG 18. The charges are further transferred to the horizontal transfer register and read out.

As disclosed, an image signal for the charges stored from time t3 to time t7 is read out from the imaging circuit 13 at time t5, or a read timing a2 as illustrated in READ TIMING; and hence the period from time t3 to time t7 is an exposure period 9 as illustrated in EXPOSURE TIMING, by the mechanical shutter whose timing is illustrated as MECHANICAL SHUTTER TIMING.

The image signals for the fist and the second frames are supplied to the signal processor 19 and combined as an output composite imaging signal, as illustrated in SIGNAL PROCESSING 5.

In this embodiment, the displacement "d" of the image signals in time for the fist and the second frames corresponds to the exposure time 8 from time t6 to time t3, being shorter than that shown in FIG. 5, thus further avoiding blurry photos.

Figure 7:
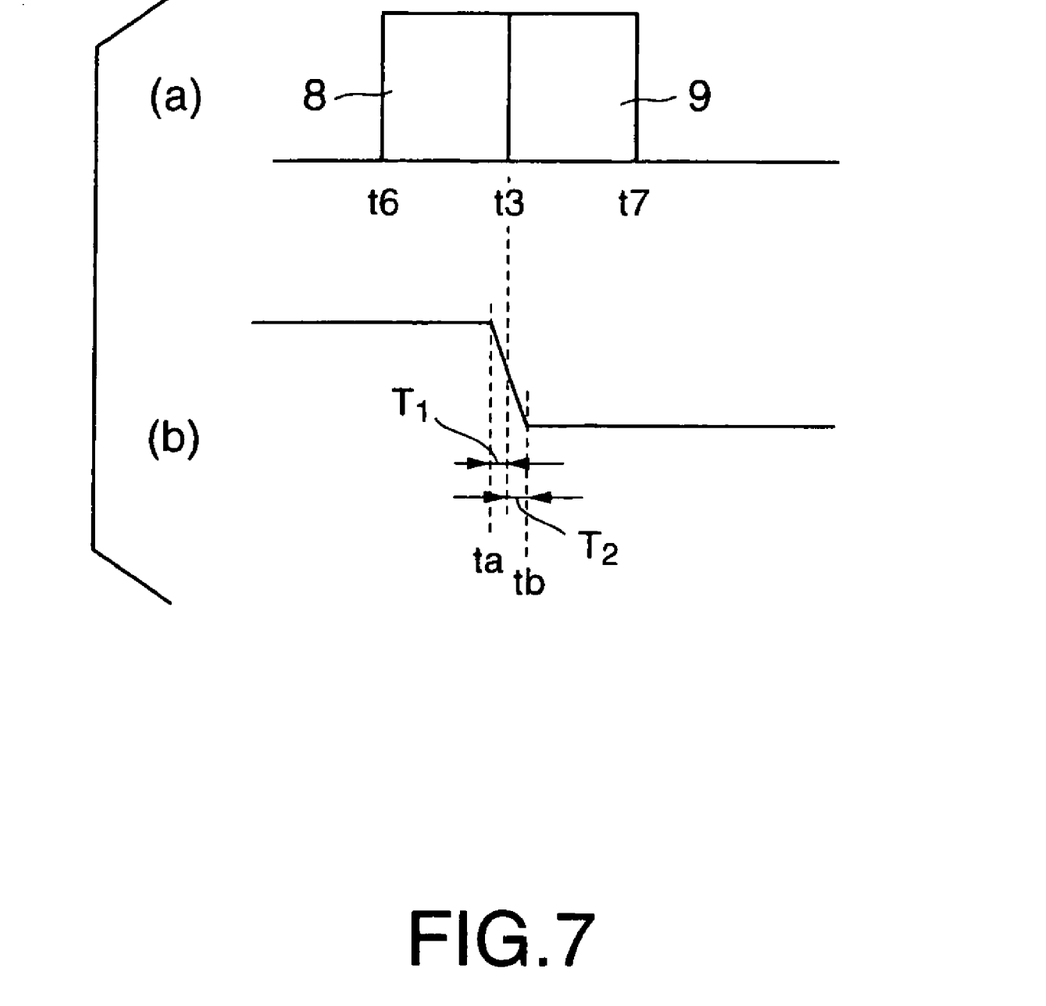
FIG. 7 is a timing chart for explaining the third preferred embodiment of an operation of a solid-state image sensing apparatus according to the present invention.

Next, the operation as the third preferred embodiment of the solid-state imaging apparatus according to the present invention will be described.

In the first and the second embodiments shown in FIGS. 5 and 6, the optical low-pass filter of the pixel-shift mechanism 12 is rotated by the angle "i" between the positions 21a and 21b, as shown in FIG. 4, for pixel-shifting at time t3 that is the starting moment of the second frame.

Compared to these embodiments, in the third embodiment, the optical low-pass filter of the pixel-shift mechanism 12 starts to rotate at time ta within the exposure period 8 just before time t3, and stops at time tb within the exposure period 9, as shown in FIG. 7. The illustration in (a) of FIG. 7 corresponds to that of EXPOSURE TIMING in FIG. 6. The period T1 from time ta to time t3 and the period T2 from time t3 to tb are preferably equal to each other, but not a must.

As disclosed, rotation of the optical low-pass filter of the pixel-shift mechanism 12 over the exposure periods 8 and 9 further avoids blurry photos.

The present invention is not limited to the embodiments disclosed above.

The electronic shutter is employed in the embodiments for exposure for the first frame. However, the mechanical shutter can be employed for exposure for the first frame.

The embodiments combine the image signals for two successive frames. However, image signals for two successive fields can be combined for obtaining a composite image signal.

Not only a still image but also a moving picture can be processed by the present invention.

Image scanning in the embodiments is a progressive scanning-type. However, the present invention can employ an interlace scanning-type image sensing apparatus.

As disclosed above, according to the present invention, the image sensing device is exposed to light from an object by a shutter, provided between the object and the solid-state image sensing device, for a first exposure period and a second exposure period that directly follows the first exposure period. The first and the second periods are the same length in time. Each exposure period for exposing the solid-state image sensing device to the light corresponds to one frame or one filed of the object. A passage of the light that has passed the shutter and incident to the solid-state image sensing device is shifted in a predetermined direction with respect to the solid-state image sensing device at least in the second exposure period. Image signals converted for the first and the second exposure periods are combined to generate a composite image signal.

Thus, the present invention offers a pixel-shifting function with less blurry photos for solid-state image sensing apparatus.

Moreover, according to the present invention, the passage of light incident to the solid-state image sensing device can be shifted for a period from a moment in the first exposure period to another moment in the second exposure period.

This arrangement offers a pixel-shifting function with less blurry photos at high shutter speed for solid-state image sensing apparatus.

What is claimed is:

1. An image sensing apparatus comprising:
   a solid-state image sensing device having an electronic shutter to convert light from an object into an image signal;
   a mechanical shutter, provided between the object and the solid-state image sensing device, to expose the solid-state image sensing device to the light for a first exposure period and a second exposure period that directly follows the first exposure period, the first and the second periods being the same length in time;
   a shift mechanism to change a relative positional relationship between a passage of the light that has passed the mechanical shutter and incident to the solid-state image sensing device and the solid-state image sensing device for a period from a moment in the first exposure period to another moment in the second exposure period, the shift mechanism including an optical low-pass filter that rotates between two predetermined positions to change the relative positional relationship, wherein the optical low-pass filter starts to rotate at a moment within the first exposure period and stops at another moment within the second exposure period, a period for which the optical low-pass filter rotates in the first exposure period and another period for which the optical low-pass filter rotates in the second exposure period being equal to each other; and
   a processor to combine image signals converted for the first and the second exposure periods to generate a composite image signal,
   wherein the mechanical or the electronic shutter is switched from a closed state to an opened state to start the first exposure period and the mechanical shutter is switched from the opened state to the closed state to finish the second exposure period.

2. A method of image sensing using a solid-state image sensing device having an electronic shutter for converting light from an object into an image signal, the method comprising the steps of:
   exposing the solid-state image sensing device via a mechanical shutter to the light for a first exposure period and a second exposure period that directly follows the first exposure period, the first and the second periods being the same length in time;

switching the mechanical or the electronic shutter from a closed state to an opened state to start the first exposure period;

switching the mechanical shutter from the opened state to the closed state to finish the second exposure period;

changing a relative positional relationship between a passage of the light incident to the solid-state image sensing device and the solid-state image sensing device for a period from a moment in the first exposure period to another moment in the second exposure period;

starting to rotate an optical low-pass filter at a moment within the first exposure period and stopping the optical low-pass filter at another moment within the second exposure period between two predetermined positions to change the relative positional relationship, a period for which the optical low-pass filter rotates in the first exposure period and another period for which the optical low-pass filter rotates in the second exposure period being equal to each other; and combining image signals converted for the first and the second exposure periods to generate a composite image signal.

* * * * *